(12) United States Patent
Hitomi et al.

(10) Patent No.: US 10,093,577 B2
(45) Date of Patent: Oct. 9, 2018

(54) FIBER-REINFORCED CARBONATED HYDRAULIC INORGANIC MOLDED PLATE AND METHOD FOR PRODUCING SAME

(71) Applicant: KURARAY CO., LTD., Kurashiki-shi (JP)

(72) Inventors: Yoshinori Hitomi, Okayama (JP); Shinya Inada, Okayama (JP); Yoshihiro Iwasaki, Osaka (JP); Hiroaki Noritake, Osaka (JP); Saburo Hada, Tsurugashima (JP); Minoru Morioka, Itoigawa (JP); Takayuki Higuchi, Itoigawa (JP); Makoto Shoji, Itoigawa (JP); Katsuaki Iriuchijima, Singapore (SG)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/145,502

(22) Filed: May 3, 2016

(65) Prior Publication Data

US 2016/0289119 A1 Oct. 6, 2016

Related U.S. Application Data

(63) Continuation of application No. PCT/JP2014/079278, filed on Nov. 4, 2014.

(30) Foreign Application Priority Data

Nov. 5, 2013 (JP) ................................. 2013-229661
Sep. 30, 2014 (JP) ................................. 2014-201206

(51) Int. Cl.
| | |
|---|---|
| *C04B 16/06* | (2006.01) |
| *C04B 28/02* | (2006.01) |
| *C04B 28/04* | (2006.01) |
| *C04B 40/02* | (2006.01) |
| *C04B 111/00* | (2006.01) |

(52) U.S. Cl.
CPC .......... *C04B 16/0641* (2013.01); *C04B 28/02* (2013.01); *C04B 28/025* (2013.01); *C04B 28/04* (2013.01); *C04B 40/0231* (2013.01); *C04B 40/0236* (2013.01); *C04B 2111/0062* (2013.01); *C04B 2111/00586* (2013.01); *Y02W 30/97* (2015.05)

(58) Field of Classification Search
CPC . C04B 16/0641; C04B 28/025; C04B 18/241; C04B 40/0231
See application file for complete search history.

(56) References Cited

U.S. PATENT DOCUMENTS

| | | |
|---|---|---|
| 2001/0023655 A1 | 9/2001 | Knopf et al. |
| 2012/0245254 A1 | 9/2012 | Shimano |
| 2013/0139727 A1 | 6/2013 | Constantz et al. |
| 2014/0191436 A1 | 7/2014 | Chastain et al. |
| 2015/0031799 A1 | 1/2015 | Constantz et al. |

FOREIGN PATENT DOCUMENTS

| | | |
|---|---|---|
| DE | 693 21 911 T2 | 5/1999 |
| EP | 0 585 998 A1 | 3/1994 |
| JP | 6-263510 A | 9/1994 |
| JP | 6-263562 A | 9/1994 |
| JP | 9-132481 A | 5/1997 |
| JP | 10-102686 A | 4/1998 |
| JP | 10-194798 A | 7/1998 |
| JP | 2948884 B2 | 7/1999 |
| JP | 2001-261467 A | 9/2001 |
| JP | 2004-107129 A | 4/2004 |
| JP | 2012-91987 A | 5/2012 |
| WO | 2012/155103 A1 | 11/2012 |

OTHER PUBLICATIONS

Machine translation of JPH09132481, 1997. (Year: 1997).*
Britannica (Cement—Building material). (Year: 2017).*
Extended European Search Report dated May 29, 2017 in European Patent Application No. 14859513.5.
International Search Report dated Feb. 3, 2015 issued in PCT/JP2014/079278 (with English translation).
Combined Office Action and Search Report dated Sep. 15, 2017 in Columbian Patent Application No. 16146846 (with Partial English language translation).

* cited by examiner

*Primary Examiner* — Wenwen Cai
(74) *Attorney, Agent, or Firm* — Oblon, McClelland, Maier & Neustadt, L.L.P.

(57) ABSTRACT

Provided is a fiber-reinforced carbonated hydraulic inorganic molded plate having a high bulk specific gravity, a high flexural strength, and a small dimensional change rate per specific gravity. (1) A fiber-reinforced carbonated hydraulic inorganic molded plate including: a cement component, a pulp, and a reinforcing fiber having an aspect ratio in a range of 40 to 1000; and being a carbonation-cured molded plate. (2) A molded plate being a cured product of a composition including at least a cement component, a pulp, and a reinforcing fiber, wherein the molded plate is a fiber-reinforced carbonated hydraulic inorganic molded plate and has a carbonation reaction rate of higher than or equal to 30%.

17 Claims, 2 Drawing Sheets
(2 of 2 Drawing Sheet(s) Filed in Color)

[Fig. 1]
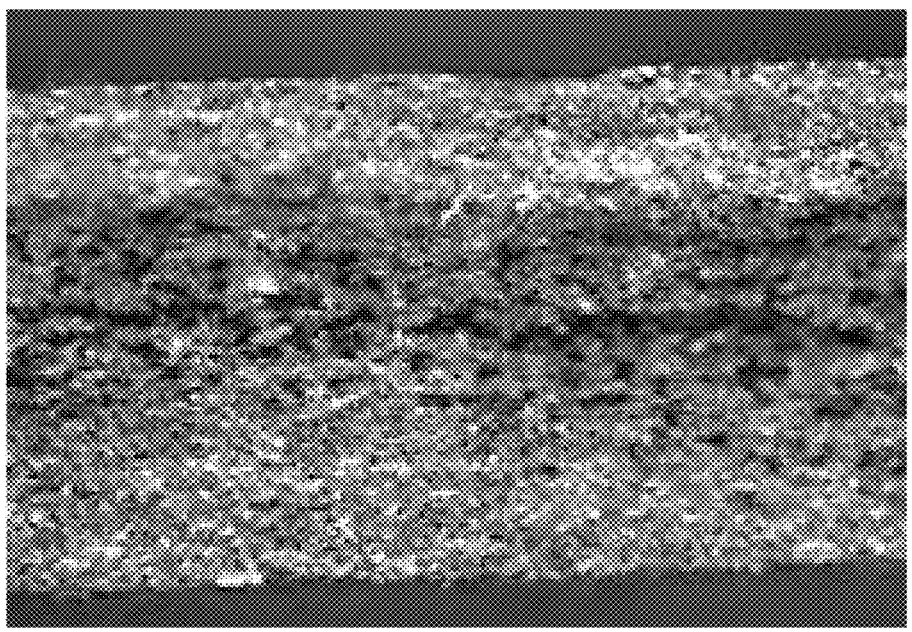

[Fig. 2]
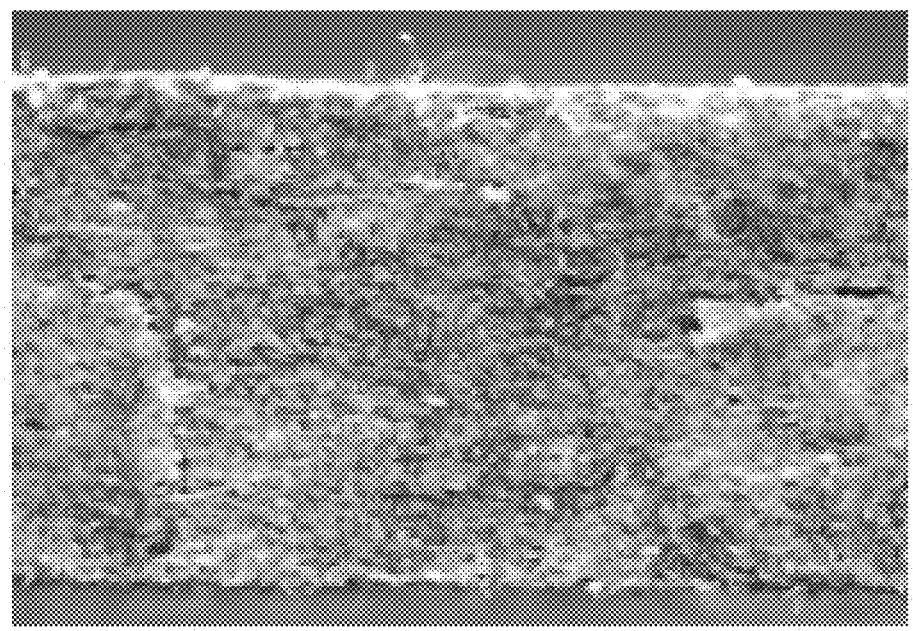

FIBER-REINFORCED CARBONATED HYDRAULIC INORGANIC MOLDED PLATE AND METHOD FOR PRODUCING SAME

CROSS REFERENCE TO THE RELATED APPLICATION

This application is a continuation application, under 35 U.S.C. § 111(a), of international application No. PCT/JP2014/079278, filed Nov. 4, 2014, which claims priority to Japanese patent application No. 2013-229661, filed Nov. 5, 2013 and Japanese patent application No. 2014-201206, filed Sep. 30, 2014, the entire disclosures of which are herein incorporated by reference as a part of this application.

BACKGROUND OF THE INVENTION

The present invention relates to a hydraulic inorganic molded (formed or shaped) plate (panel) and a method for producing the same. The hydraulic inorganic molded plate is carbonated and is reinforced with fibers. The hydraulic inorganic molded plate has a high bulk specific gravity, being excellent in flexural strength, and having a small dimensional change rate per specific gravity; and is advantageously applicable to building materials such as roof materials and wall materials.

Patent Document 1 (JP Laid-open Patent Publication No. H10-194798) discloses that, where a cured cement body having a high content of belite is placed in an atmosphere containing carbon dioxide gas at a high concentration, it is possible to obtain a cured body that is excellent in permeability of carbon dioxide gas and has a flexural strength enhanced by carbonation.

Patent Document 2 (JP Laid-open Patent Publication No. 2004-107129) discloses a cement composition used for carbonated cured bodies, the composition containing a polymer admixture, γ-belite (γ-$2CaO.SiO_2$), and a binder that includes a cement. Patent Document 2 discloses a cement concrete composition for carbonated cured bodies, the cured bodies being used for a large board used for a relatively large building, for example, panels such as curtain walls and ALCs; and a method for producing the same.

According to Patent Document 3 (JP Laid-open Patent Publication No. H06-263562), after starting calcium hydroxide generation caused by hydration in primary curing, demolding is performed. Then, curing is performed under a carbon dioxide gas atmosphere (i) from an acceleration period in which hydration of alite ($C_3S$) of cement is activated, (ii) via a deceleration period in which a great amount of calcium hydroxide crystals are generated in a cured body, (iii) to a stationary period in which the cured body is densified.

According to Patent Document 4 (JP Laid-open Patent Publication No. H09-132481), in the curing process of a composition for a hydraulic inorganic molding, a parameter "permeability" is introduced to obtain a molded product with high porosity so as to investigate "sound absorptivity" or "heat insulation".

Patent Document 5 (JP Laid-open Patent Publication No. 2012-91987) discloses an invention related to a fiber suitable for improving explosion resistance of monolithic refractories; and a monolithic refractory (castable refractory) to which the fiber is added. Patent Document 5 discloses that the permeability is effectively used for improving explosion resistance of the monolithic refractory.

SUMMARY OF THE INVENTION

Patent Document 1 recognizes that carbonation of a cured cement body enables to enhance flexural strength of the cured cement body in the manufacturing process of concrete goods. However, Patent Document 1 does not suggest an application of carbonation to a hydraulic inorganic molded plate required to have dimensional stability, the molded plate being formed by adding a pulp and a reinforcing fiber to a cement.

Patent Document 2 recites that a polymer admixture used as an organic polymeric carbonation accelerator is preferred. However, Patent Document 2 does not suggest an application of the polymer admixture to a hydraulic inorganic molded plate required to have dimensional stability, the molded plate being formed by adding a pulp and a reinforcing fiber to a cement.

Patent Document 3 specifically describes diffusion of carbon dioxide gas. However, Patent Document 3 does not suggest a fiber-reinforced carbonated inorganic molded plate required to have dimensional stability, the molded plate being formed by adding both a pulp and a reinforcing fiber to a cement.

Patent Document 4 examines relevancy between permeability and porosity in an inorganic porous body, but does not suggest relevancy between permeability and carbonation.

Patent Document 5 considers permeability in view of explosion-inhibiting effect for monolithic refractories, but does not suggest relevancy between permeability and carbonation.

The inventors of the present invention have considered that, unlike typical concrete goods, a fiber-reinforced hydraulic inorganic molded plate used as building materials such as roof materials and wall materials is required to have a small dimensional change rate while having a high bulk specific gravity and a high flexural strength. Accordingly, the inventors have set an object to be attained by the present invention to provide a fiber-reinforced hydraulic inorganic molded plate having a high bulk specific gravity, a high flexural strength, and a small dimensional change rate.

The inventors of the present invention have conducted an extensive study in order to resolve the aforementioned problem by placing a focus on relationship between a method for curing a cement composition and physical properties of a cured body, and have attained to a first configuration of the present invention.

A first configuration (a first product embodiment) of the present invention is directed to a fiber-reinforced carbonated hydraulic inorganic molded plate including at least a cement component, a pulp, and a reinforcing fiber having an aspect ratio in a range of 40 to 1000; and being a carbonation-cured molded plate.

The molded plate preferably has a dimensional change rate per specific gravity of less than or equal to 0.1%.

The dimensional change rate per specific gravity is a value obtained by dividing a dimensional change rate measured in accordance with JIS A 5430 by a bulk specific gravity of the molded plate.

In the hydraulic inorganic molded plate, the reinforcing fiber is preferably a polyvinyl alcohol fiber.

Further, the inventors of the present invention have found that where a pre-cured molded body having a specific permeability of greater than or equal to a certain value is subjected to carbonation, development in carbonation of the molded body progresses up to an internal (inner) layer of the molded body having a plate structure, and therefore have attained a second configuration of the present invention.

A second configuration (a second product embodiment) of the present invention is directed to a fiber-reinforced carbonated hydraulic inorganic molded plate, the molded plate being a cured product of a composition including at least a cement component, a pulp, and a reinforcing fiber, wherein the molded plate is fiber-reinforced and carbonated by carbonation-curing; and has a carbonation reaction rate (a proportion of carbonated portion based on carbonated and un-carbonated portions) of higher than or equal to 30%.

In the description herein, the evaluation of "carbonated (neutralized)" can be determined as no coloration of a cross-sectional surface of a molded plate into red where the molded plate is cut in a vertical direction and then an aqueous phenolphthalein solution is applied to the cross-sectional surface. A molded plate having been cured by carbonation shifts from a highly alkaline state to a neutral state. Therefore, an un-carbonated portion is colored into bright red whereas a carbonated portion is not brightly colored. Therefore, the carbonation can be detected.

The hydraulic inorganic molded plate preferably has a carbonation reaction rate of higher than or equal to 50%.

The hydraulic inorganic molded plate preferably has a dimensional change rate per specific gravity of less than or equal to 0.1%.

In the hydraulic inorganic molded plate, the cement component preferably is a cement containing a belite at a proportion of 18% by mass or more. The belite preferably has a reaction rate of higher than or equal to 70%.

In the hydraulic inorganic molded plate, the reinforcing fiber is preferably a polyvinyl alcohol fiber.

A third configuration (first production method embodiment) of the present invention is an embodiment directed to a method for producing a product according to the first configuration. The third configuration of the present invention is directed to a method for producing a fiber-reinforced carbonated hydraulic inorganic molded plate, the method including:

pre-curing a composition that contains at least a cement component, a pulp, a reinforcing fiber having an aspect ratio in a range of 40 to 1000, and water to obtain a pre-cured body; and carbonation-curing the pre-cured body to obtain a fiber-reinforced carbonated hydraulic inorganic molded plate.

In the above method for producing the hydraulic inorganic molded plate, the composition preferably includes, as the cement component, a cement containing a belite at a proportion of 18% by mass or more; and is rendered to be pre-cured to obtain a molded body having a sufficient hardness to be demoldable (a sufficient hardness for releasing the body from a mold); and the molded body is carbonation-cured.

In the production method of the hydraulic inorganic molded plate, the pre-curing is preferably performed under an atmosphere having a humidity of 60 to 100%.

In the production method of the hydraulic inorganic molded plate, the carbonation-curing is preferably performed under an atmosphere containing carbon dioxide gas at a concentration of 5 to 30%.

A fourth configuration (second production method embodiment) of the present invention is an embodiment for a method for producing a product according to the second configuration, and the fourth configuration of the present invention is directed to a method for producing a fiber-reinforced carbonated hydraulic inorganic molded plate, and the method includes:

preparing a molded body having a permeability of higher than or equal to $0.1 \times 10^{-15}$ m$^2$ by pre-curing a composition containing at least a cement component, a pulp, a reinforcing fiber, and water; and carbonation-curing the obtained molded body so as to produce a fiber-reinforced carbonated hydraulic inorganic molded plate having a carbonation reaction rate of higher than or equal to 30%.

In the method for producing the hydraulic inorganic molded plate, the composition preferably includes, as the cement component, a cement containing a belite at a proportion of 18% by mass or more; and is rendered to be pre-cured to obtain a molded body having a sufficient hardness to be demoldable (a sufficient hardness for releasing the body from a mold); and the molded body is carbonation-cured.

Any combination of at least two constructions, disclosed in the appended claims and/or the specification should be construed as included within the scope of the present invention. In particular, any combination of two or more of the appended claims should be equally construed as included within the scope of the present invention.

According to the first configuration (a first product embodiment) of the present invention, since the fiber-reinforced carbonated hydraulic inorganic molded plate contains at least a cement component, a pulp, and a reinforcing fiber having an aspect ratio in a range of 40 to 1000, as well as has a densified structure due to carbonation-curing, the molded plate has a high bulk specific gravity and a high anti-water permeability, and is excellent in paintability. Further, carbonation-curing makes it possible to achieve high flexural strength, as well as small dimensional change rate per specific gravity. Therefore, the obtained fiber-reinforced carbonated hydraulic inorganic molded plate is advantageously used as building materials such as roof materials and wall materials.

According to the second configuration (a second product embodiment) of the present invention, by carrying out carbonation-curing so as to produce a molded plate having a carbonation reaction rate of higher than or equal to 30%, the molded plate is carbonated to inside thereof. Such a molded plate can achieve high bulk specific gravity, and high flexural strength, and further small dimensional change rate per specific gravity. Thus, it is possible to provide a fiber-reinforced carbonated hydraulic inorganic molded plate that is advantageously used as building materials such as roof materials and wall materials.

According to the third configuration (a first production method embodiment) of the present invention, a composition containing at least a cement component, a pulp, a reinforcing fiber, and water is subjected to pre-curing (primary curing), and then subjected to carbonation-curing (secondary curing). In an ordinal natural curing without carbonation, a cement hydration speed is so slow that the time required for the curing is about two weeks to one month. On the contrary, since the carbonation reaction speed is faster than the cement hydration speed, the carbonation-curing after the pre-curing render the time required for the curing to be shortened to about one to three days so as to enable to obtain a densified cured body in a short period of time.

According to the fourth configuration (a second production method embodiment) of the present invention, by pre-curing a composition that contains a cement component, a pulp, a reinforcing fiber, and water so as to obtain a pre-cured molded body having a permeability of higher than or equal to $0.1 \times 10^{-15}$ m$^2$, followed by carbonation-curing the pre-cured molded body, it is possible to produce a fiber-reinforced carbonated hydraulic inorganic molded plate in which the carbonation has developed to the inside of the molded plate so as to have a carbonation reaction rate of higher than or equal to 30%. Accordingly, the molded body has high bulk specific gravity, high flexural strength, and small dimensional change rate per specific gravity so as to be advantageously used as building materials such as roof materials and wall materials.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims.

FIG. 1 is a photograph showing a colored state of a cross-sectional surface of a carbonated hydraulic inorganic molded plate according to a second product embodiment of the present invention, after spraying an aqueous phenolphthalein solution onto the cross-sectional surface; and FIG. 2 is a photograph showing a colored state of a cross-sectional surface of a carbonated hydraulic inorganic molded body as a compared object, after spraying an aqueous phenolphthalein solution onto the cross-sectional surface.

DESCRIPTION OF EMBODIMENTS

Fiber-Reinforced Carbonated Hydraulic Inorganic Molded Plate and Method for Producing Same A fiber-reinforced carbonated hydraulic inorganic molded plate according to the present invention includes the following two embodiments: an embodiment according to a first configuration (first product embodiment) and an embodiment according to a second configuration (second product embodiment).

The first product embodiment: a fiber-reinforced carbonated hydraulic inorganic molded plate including at least a cement component, a pulp, and a reinforcing fiber having an aspect ratio in a range of 40 to 1000; and being a carbonation-cured molded plate. The fiber-reinforced carbonated hydraulic inorganic molded plate preferably has a dimensional change rate per specific gravity of less than or equal to 0.1%. The molded plate may have a bulk specific gravity of, for example, higher than or equal to 1.6, and/or a flexural strength of, for example, higher than or equal to 20 N/mm$^2$.

The second product embodiment: a hydraulic inorganic molded plate, the molded plate being a cured product of a composition including at least a cement component, a pulp, and a reinforcing fiber, wherein the molded plate is fiber-reinforced and carbonated by carbonation-curing; and the molded plate has a carbonation reaction rate of higher than or equal to 30%.

A method for producing a fiber-reinforced carbonated hydraulic inorganic molded plate according to the present invention includes the following two embodiments: an embodiment according to a third configuration (a first production method embodiment) and an embodiment according to a fourth configuration (a second production method embodiment).

The first production method embodiment (corresponding to the first product embodiment): a method for producing a fiber-reinforced carbonated hydraulic inorganic molded plate, the method including: pre-curing a composition that contains at least a cement component, a pulp, a reinforcing fiber having an aspect ratio in a range of 40 to 1000, and water to obtain a pre-cured body; and carbonation-curing the pre-cured body to obtain a fiber-reinforced carbonated hydraulic inorganic molded plate.

The second production method embodiment (corresponding to the second product embodiment): a method for producing a fiber-reinforced carbonated hydraulic inorganic molded plate, and the method including:

preparing a molded body having a permeability of higher than or equal to $0.1 \times 10^{-15}$ m$^2$ by pre-curing a composition containing at least a cement component, a pulp, a reinforcing fiber, and water; and carbonation-curing the obtained molded body so as to produce a fiber-reinforced carbonated hydraulic inorganic molded plate having a carbonation reaction rate of higher than or equal to 30%.

The following description is applicable to any of the first product embodiment and the second product embodiment, and/or any of the first production method embodiment and the second production method embodiment, unless otherwise specified.

Fiber-Reinforced Carbonated Hydraulic Inorganic Molded Body

A fiber-reinforced carbonated hydraulic inorganic molded plate of the present invention is obtained by pre-curing a composition that contains at least a cement component, a pulp, a reinforcing fiber, and water and then carbonation-curing the pre-cured composition. In the present invention, the hydraulic inorganic molded plate means any of a plate that is formed by preparing a composition containing at least a cement component, a pulp, and a reinforcing fiber mixed with water, and subjecting the obtained composition to casting, dehydrating, extruding and/or others. The thickness thereof is about 2 to 100 mm, and preferably about 3 to 90 mm. The shape of the plate may have not only a planar shape but also a shape including a curved surface. The plate may include a stepped portion, an uneven portion, or a corrugated potion as long as the plate has the above-described thickness.

The molded plate according to the second product embodiment relates to a molded plate obtained by curing the composition, the molded plate having a carbonation reaction rate of higher than or equal to 30%. The molded plate is produced by preparing a molded body having a permeability of higher than or equal to $0.1 \times 10^{-15}$ m$^2$ by pre-curing the composition, and carbonation-curing the obtained molded body so as to produce a molded plate having a carbonation reaction rate of higher than or equal to 30% (second production method embodiment).

Cement Component

Examples of the cement component used in the present invention may include various Portland cements such as an ordinary cement, a high early strength cement, and an ultrahigh early strength cement. Further, examples thereof may include various mixed cements of a blast furnace slag, a fly ash, or a silica at least one of them being blended with the Portland cement, a moderate-heat cement, and an alumina cement.

The ordinary cement contains cement minerals such as alite: $3CaO \cdot SiO_2$ (composition formula $C_3S$), belite: $2CaO \cdot SiO_2$ (composition formula $C_2S$), aluminate $Al_2O_3$ (composition formula $C_3A$), and ferrite: $4CaO \cdot Al_2O_3 \cdot Fe_2O_3$ (composition formula $C_4AF$).

The belite is a kind of dicalcium silicate that contains CaO and $SiO_2$ as main components; and includes an α-belite, an α'-belite, a β-belite, and a γ-belite, each of which are different from each other in a crystal structure or density. Among them, hydraulicity can be attained by mixing the component of the α-belite, the α'-belite, or the β-belite with water to be reacted. On the other hand, the γ-belite does not exhibit hydraulicity, but reacts with carbon dioxide. Basically, ordinary cement such as Portland cement contains hardly (substantially no) γ-belite (γ type belite).

Since the cement component according to the present invention is carbonation-cured after pre-curing, it is possible to use commercially available belite cements, or cements obtained by various cements being mixed with belite cement. In the present invention, among the α-belite, the α'-belite, the β-belite, and the γ-belite as described above, the β-belite and the γ-belite are preferable.

According to the present invention, in the cement component, the content of the belite is 18 to 60% by mass, and preferably 20 to 58% by mass. Where the content of the belite is excessively small, an amount of belite that can be carbonated is excessively small, and a densification effect is insufficient, so that dimensional stability and anti-water permeability cannot be expected. On the other hand, where the content of the belite is excessively great, although carbonation can be performed, the amount of a hydraulic component that serves as a binder is reduced, and a sufficient flexural strength may not be obtained.

A reaction rate of the belite is preferably higher than or equal to 70%. Similarly to alite, when hydration occurs, the belite causes generation of C—S—H gel to exhibit a performance as a binder. However, since a hydration speed of the belite is lower than that of alite, the reaction rate is still low for manufacture in factories and the effect as the binder is insufficient. In contrast, in the technique of the present invention, both the hydration and the carbonation simultaneously occur, so that the reaction rate of the belite can assuredly become higher than or equal to 70% at an early stage, and a product that has a high flexural strength and is excellent in dimensional stability can be provided. The reaction rate is preferably higher than or equal to 75%, and more preferably higher than or equal to 80%.

Pulp

In the present invention, the pulp to be added in the hydraulic inorganic molded plate may be natural or synthetic pulp. As the natural pulp, an unbleached or bleached pulp produced from softwood or hardwood is mainly used. The pulp obtained from straw, bamboo, cotton, hemp, ramie, paper mulberry, oriental paperbush, eucalyptus or the like, can be also used. Collected waste paper that is obtained from newspaper, paper bags, cardboard boxes, and the like can be also used. As the synthetic pulp, polyolefin pulp, polyaramide pulp, or the like can be used. Further, any fibril-like substance having a shape similar thereto may be used. Among them, bleached pulp produced from softwood or hardwood is preferably used.

In order to obtain the composition according to the present invention, the pulp may be previously beaten by a beating machine such as a refiner or a beater. The pulp may have a Canadian freeness of preferably 30 to 750 ml, and more preferably 50 to 300 ml.

The content of the pulp may be 1 to 10% by mass of a solid content in the composition, and preferably 2 to 6% by mass of a solid content in the composition. Excessive reduction of the content thereof causes deterioration in capturing of particulates. Excessive increase of the content thereof is disadvantageous in that uniformity of dispersion becomes insufficient, and separation between layers may be caused or flame resistance may be reduced.

Reinforcing Fiber

Into the composition according to the present invention, the reinforcing fiber may be added for providing strength and toughness in the hydraulic inorganic molded plate. Examples of the reinforcing fibers may include inorganic fibers such as anti-alkali glass fibers, carbon fibers, stainless fibers, ceramic fibers, and asbestos fibers; organic fibers such as regenerated fibers (e.g., cellulosic fibers) and synthetic resin fibers. Among them, in view of reduction of the weight, organic fibers, in particular, synthetic resin fibers are advantageously used. Examples of the synthetic resin fibers may include polyolefin fibers, polyvinyl alcohol fibers, polyamide fibers, aramid fibers, polyester fibers, acrylonitrile fibers, and polyurethane fibers. Among them, in view of alkali resistance, mechanical strength, and bonding to the cement, polyvinyl alcohol fibers are advantageously used.

The reinforcing fiber used in the first product embodiment of the present invention has an aspect ratio essentially in a range of 40 to 1000, and preferably in a range of 50 to 900. Further, the reinforcing fiber used in the second product embodiment of the present invention preferably has an aspect ratio within the above-described range. Where the aspect ratio is excessively small, adhesion of the fiber to the cement is insufficient, and an effect of providing toughness to the hydraulic inorganic molded plate may not become sufficient after curing. On the other hand, where the aspect ratio is greater than 1000, the fibers are apt to be easily entangled or to be excessively adhesive, so that the fibers cannot follow responsive to expansion and contraction of the hydraulic inorganic molded plate, resulting in fiber breakage.

The reinforcing fiber that is advantageously used in the first product embodiment and the second product embodiment may have a fiber diameter of preferably 1 to 200 μm and a fiber length of preferably 3 to 20 mm. Where the fiber diameter is less than 1 μm, uniform dispersion may be difficult. Where the fiber diameter is greater than 200 μm, the number of fibers per unit volume in the cured hydraulic inorganic molded plate may be too small, so that a reinforcing effect is less likely to be exhibited.

A proportion of the reinforcing fiber in the solid component in the composition may be 0.1 to 5.0% by mass, and preferably 0.3 to 4.5% by mass. Where the proportion of the reinforcing fiber is less than 0.1% by mass, a fiber reinforcing effect may be insufficient in the cured hydraulic inorganic molded plate. Where the proportion of the reinforcing fiber is greater than 5.0% by mass, uniform dispersion of the reinforcing fibers during blending may be too difficult.

Use of Reinforcing Fiber and Pulp in Combination

According to the present invention, both the pulp and the reinforcing fiber need to be added to the cement component. Addition of the reinforcing fiber can improve strength and toughness of the hydraulic inorganic molded plate. Addition of the pulp improves dispersion of the reinforcing fiber, facilitates control of permeability described below, and contributes to the reinforcing effect. Where no pulp is added, advantageous dispersion of the reinforcing fiber cannot attained, and further the control of the permeability becomes difficult. As a result, advantageous physical properties cannot be obtained. Further, where no pulp is added, sheetmaking cannot be performed for the composition, and production of the hydraulic inorganic molded plate by sheetmaking process becomes difficult. The sheetmaking refers to a process in which the slurry obtained by suspending a cement component and the like in an aqueous medium is filtered through a mesh to be shaped. A sheet body produced by sheetmaking refers to a molded body (molded plate) formed by the sheetmaking.

Aggregate

According to the present invention, the composition containing the cement component may contain various aggregates as appropriate. Examples of the aggregates include fine aggregates, lightweight aggregates, and coarse aggregates. The aggregates may be used singly or in combination of two or more.

As the fine aggregate, for example, fine particles each having a particle diameter of 5 mm or less can be used, and examples thereof include sand such as river sand, mountain sand, sea sand, crushed sand, silica sand, slag, glass sand, iron sand, ash sand, silica fume, calcium carbonate, and artificial sand. Examples of the lightweight aggregates include natural lightweight aggregates such as volcanic gravel, expanded slag, and cinder; and artificial lightweight aggregates such as foamed pearlstone, foamed perlite, foamed obsidian, vermiculite, shirasu balloon, and fly ash microballoon.

Examples of the coarse aggregates include aggregates in which particles each having a particle diameter of 5 mm or greater are contained in 85% by mass or more, and, for example, various gravels, artificial aggregates, or regenerated aggregates can be used as the coarse aggregate.

Additive

According to the present invention, the composition that contains the cement component may include, as appropriate, various admixtures such as an AE agent, a fluidizer, a water-reducing agent, a high-performance water-reducing agent, an AE water-reducing agent, a high-performance AE water-reducing agent, a thickener, a water-retaining material, a water-repellent agent, an expanding agent, a curing accelerator, a setting retarder, or the like. These admixtures may be used singly or in combination of two or more.

According to the composition of the present invention, a water-soluble polymer may be added as appropriate. Examples of the water-soluble polymer include a cellulose ether such as a methyl cellulose, a hydroxymethyl cellulose, a hydroxyethyl cellulose, a carboxymethyl cellulose, and a hydroxypropyl methyl cellulose; a polyvinyl alcohol; a polyacrylic acid; and a lignin sulfonate. These polymers may be used singly or in combination of two or more.

Further, in the composition of the present invention, a curing accelerator for the hydraulic component may be added as appropriate. Examples of the curing accelerator may include calcium chloride, aluminum chloride, iron chloride, sodium chloride, magnesium chloride, alkali sulfate, alkali carbonate, and sodium silicate.

Further, in the composition of the present invention, a carbonation accelerator may be added as appropriate. Examples of the carbonation accelerator may include, as an aqueous polymer dispersion, a thermoplastic emulsion such as a polyacrylic ester, a polyvinyl acetate, and an ethylene-vinyl acetate copolymer, and a synthetic rubber latex such as a styrene-butadiene rubber. Further, examples thereof may include, as a redispersible polymer powder (powdery emulsion), an ethylene-vinyl acetate copolymer and a vinyl acetate-vinyl versatate (VAVeoVa). Further, examples thereof may include, as a water-soluble polymer, a cellulose derivative such as a methyl cellulose, and a polyvinyl alcohol.

Further, chemicals having a high affinity for carbon dioxide gas may be added. The chemicals having the high affinity are not limited to any specific chemicals, and examples of the chemicals having the high affinity may include amine chemicals such as monoethanolamine, diethanolamine, and to triethanolamine, and gels to which the amine chemicals are fixed. The chemicals having the high affinity may be used singly or in combination of two or more.

Amount of Water to be Blended

The composition according to the present invention may contain water such that, for example, a water-cement ratio (W/C) is about 20 to 80% by mass, preferably 25 to 70% by mass, and more preferably 30 to 60% by mass.

Admixture

The cement component, the pulp, the reinforcing fiber, and water are mixed by publicly known or conventional mixing means such as a mixer to form the composition. In the mixing, it is preferable that, after the pulp and water are mixed to disperse the pulp in the water, the other cement components are added.

In the mixing, the order of components for the mixing is not limited to any specific order. Preferably, the pulp and water are mixed to disperse the pulp in the water, and thereafter the cement component and other additives are poured and mixed, and the reinforcing fiber is then added at the end.

Forming or Molding

The slurry composition having been prepared as described above is fed into a plurality of tanks of a wet-sheetmaking machine. In each of the tanks, by rotation of a mesh cylinder having a negative pressure inside, a cake is formed onto the cylinder surface, and then conveyed onto a making roll. After allowing the conveyed cake to have a predetermined thickness used as a single layer or multiple layers, the conveyed cake is detached from a winding roll to obtain a plate-like molded product in a wet state. The plate-like molded product that may be press-molded using a pressing machine is cured (pre-cured and subjected to carbonation-curing), and then dried as appropriate, to produce a desired hydraulic inorganic molded plate. The above description relates to an embodiment using a Hatschek sheetmaking machine. However, the present invention is not limited to the above embodiment in any way, and can be applied to Fourdrinier sheetmaking such as one layer sheetmaking, cast molding; press-molding, extrusion molding, or a flow-on method to produce a formed slurry having a desired thickness at one time or at several times.

Pre-Curing

The pre-curing (primary curing) according to the present invention may be carried out such that a composition molded into a predetermined shape is pre-cured to a degree that the molded composition is cured on the whole. The molded composition that is not wholly cured may be broken during handling of the molded composition when the molded composition moves into the subsequent process for removing plate or demolding. Further, the molded composition that is not entirely cured is also disadvantageous from the viewpoint of densification of the molded body that is one of the most important points of the present invention, because if the molded composition that is not entirely cured is subjected to carbonation, carbonation causes expansion of the molded body due to increase in mass (or increase in volume) by $CaCO_3$ generation, resulting in failure of densification.

Accordingly, the pre-curing is preferably performed under a high humidity atmosphere at least preventing evaporation of water in the composition. Curing is caused by hydration (setting) of the cement. Evaporation of water from the molded body may inhibit hydration of the cement so as to inhibit progress of curing to such a degree enabling handling of the molded body. In general, curing and hardening are performed under an atmosphere in which the relative humidity is higher than or equal to 65%, preferably higher than or equal to 80%, more preferably higher than or equal to 90%, and most preferably 100%. Further, the curing may be performed by using such a method as to prevent evaporation of water from the composition in such a high humidity atmosphere, for example, a method in which the composition is placed in, for example, a container or a bag impervious to water, or a method in which the composition is sandwiched by plastic plates, plastic films, or metal plates. The temperature for the curing and hardening is not limited to any specific temperature. An autoclaving process may be performed in order to attain a temperature of 100° C. or higher. When a polyvinyl alcohol fiber is used as the reinforcing fiber, a process at a temperature of 120° C. or higher is not preferable in view of wet heat resistance of the fiber. Further, the maturity calculated by curing temperature (° C.)×curing time (hr) required for the curing is preferably 300 to 2000. The atmosphere gas for the curing is not limited to any specific one. Other than air, a gas such as nitrogen gas, oxygen gas, water vapor, helium gas, argon gas, or carbon dioxide gas having a concentration lower than that for the carbonation-curing, can be mixed and used in a range that does not inhibit the object of the present invention.

Permeability

After the pre-curing, the molded body preferably has a permeability of the above-described value (greater than or equal to $0.1 \times 10^{-15}$ m$^2$), more preferably the value (greater than or equal to $0.2 \times 10^{-15}$ m$^2$), and still more preferably the value (greater than or equal to $0.3 \times 10^{-15}$ m$^2$). The permeability can be adjusted by, for example, increasing the content of the pulp in the composition, by partially using the lightweight aggregates, or by adjusting pressing pressure. The obtained molded body is then subjected to carbonation-curing.

Carbonation-Curing

According to the present invention, as for the wholly hardened composition through the pre-curing, hereinafter may be sometimes referred to as a cured body, the wholly hardened composition having a sufficient hardness removable from a mold is subjected to carbonation-curing (secondary curing). Carbonation of a cured body comprising a cement is a reaction in which calcium hydroxide: $Ca(OH)_2$ generated by the hydration of the cement [see formula (1) indicated below], reacts with carbon dioxide gas: $CO_2$ having been permeated to form calcium carbonate: $CaCO_3$ and water as indicated below in formula (2). At this time, the cured cement body shifts from a high alkaline state to a neutral state. Therefore, where an aqueous phenolphthalein solution is applied to a cut face in the cross-section of the cured body, occurrence of carbonation can be easily checked by observing presence or absence of coloration.

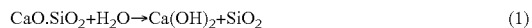

$$CaO \cdot SiO_2 + H_2O \rightarrow Ca(OH)_2 + SiO_2 \quad (1)$$

$$Ca(OH)_2 + CO_2 \rightarrow CaCO_3 + H_2O \quad (2)$$

The conditions for the carbonation is such that curing is performed under an atmosphere that contains carbon dioxide gas having a concentration of higher than the concentration in air, for example, under an atmosphere in which the concentration of the carbon dioxide gas is for example 5 to 30%, and preferably 8 to 20%. Where the concentration of the carbon dioxide gas is higher than 30%, it may be disadvantageously dangerous and uneconomical. On the other hand, where the concentration thereof is less than 5%, it may be disadvantageous in view of progress of carbonation. Examples of the atmosphere gas include air, nitrogen gas, oxygen gas, water vapor, helium gas, and argon gas in addition to carbon dioxide gas, and the gas other than the carbon dioxide gas can be mixed and used in such a range that the object of the present invention is not inhibited.

Further, it is also effective to perform the carbonation in a container having a high carbon dioxide gas pressure, in view of improvement in productivity. The temperature for the carbonation is not limited to any specific temperature. Advantageously, the higher the temperature is, the faster the carbonation reaction is.

According to the present invention, for carbonation reaction, water is required as indicated in formula (1), and therefore the carbonation-curing is preferably performed at a certain degree of humidity. When the humidity is excessively high, the surface of the molded body may be covered with dew condensation water. In such a case, carbon dioxide gas cannot enter inside of the molded body, as well as may erode the surface of the molded body so that the outer appearance of the product may be disadvantageously deteriorated. On the other hand, where the humidity is excessively low, the carbonation reaction or the hydration of the cement is disadvantageously inhibited. Therefore, the secondary curing is preferably performed under an atmosphere having a relative humidity of 30 to 95%, preferably 35 to 90%, and more preferably 40 to 85%.

According to the present invention, where the cured body obtained by hardening on the whole through the pre-curing is subjected to carbonation-curing, the carbonation reaction progresses not only on the surface of the cured body but also into the inside thereof, whereby the entirety of the molded body can be evenly densified without expanding the cured molded body. Although it is still uncertain in many points how to achieve densification of the cured cement body containing belite by carbon dioxide gas, the mechanism may be explained as follows. That is, where a typical cured cement body is carbonated (neutralized), $Ca(OH)_2$ generated by the hydration of the cement reacts with carbon dioxide gas to form $CaCO_3$ as indicated by formulae (1) and (2). On the contrary, where the cured cement body contains a large amount of belite, the belite reacts directly with carbon dioxide gas without causing hydration so as to form large amounts of $CaCO_3$ and $SiO_2$. Simultaneously, the C—S—H gel generated by hydration also reacts with carbon dioxide gas to similarly form $CaCO_3$ and $SiO_2$. Further, $Ca(OH)_2$ generated by the hydration of the cement also reacts with carbon dioxide gas to form $CaCO_3$. Therefore, it can be considered that, as compared to the typical cured cement body, a large amount of reaction product is generated at an earlier stage, and fills gaps in the cured cement body to achieve densification. In fact, densification of the internal structure can be determined from the fact that the carbonated cured body has an increased specific gravity, a reduced water absorbency, a decreased total pore volume, and further a reduced dimensional change rate, as compared to un-carbonated cured body. It should be noted that the total pore volume could be determined by pore distribution measurement using mercury intrusion porosimetry.

As the crystal form of $CaCO_3$, three kinds of forms, that is, calcite, aragonite, and vaterite are present. Although any of them can be advantageously used in view of densification, particularly preferable one includes aragonite and vaterite. Aragonite has needle crystals and is advantageously used not only for the densification but also for a bending reinforcement effect on the molded body. Vaterite has a specific gravity that is smaller than those of calcite and aragonite are. Therefore, where the cured cement body has the same mass of $CaCO_3$, the occupied volume of vaterite is greater. Thus, vaterite is more effective and advantageous for the densification. Calcite is more likely to be generated from $Ca(OH)_2$, while aragonite and vaterite are more likely to be generated from the belite or the C—S—H gel. This is another major characteristic of the present invention, in which aragonite and vaterite that are effective for the densification are generated at an earlier stage.

As compared to a method in which the specific gravity is increased to decrease gaps in a mechanical manner by pressing or the like before curing, densification caused by the carbonation is advantageous because densification can be achieved more efficiently. For example, since the dimensional change rate relates to expansion/contraction of the cured body during water absorption/evaporation, increase in specific gravity allows the dimensional change rate to be decreased. Where the specific gravity is equal, the dimensional change rate per specific gravity can be reduced when densification is performed by carbonation as compared to when the specific gravity is increased by pressing. That is, by carbonation-curing as described above, it is possible to obtain a fiber-reinforced carbonated hydraulic inorganic molded plate, according to a preferable embodiment of the present invention, the molded plate excellent in dimensional stability so as to have a dimensional change rate per specific gravity of less than or equal to 0.1%.

The manner for the carbonation-curing is not limited to any specific one. For example, carbonation-curing can be performed under a predetermined condition after introducing a pre-cured molded body into a curing tank with placing the pre-cured molded body in a rack or the like. If contact of carbon dioxide gas with the molded plate is inhibited so as to cause unevenness in reaction in the plate, a problem such that the molded plate is warped may arise. Therefore, in order to overcome unevenness in reaction, it is particularly advantageous to bringing carbon dioxide gas into uniform contact with the molded plate, for example, by a method in which the gas in the curing tank is circulated, a method in which carbon dioxide gas is evenly sprayed to the molded plate from above as well as below, or a method which prevent the molded plates from being overlaid on each other by providing a spacer or by vertically placing each of the molded plates in the rack.

In the second product embodiment and the second production method embodiment, by obtaining a molded body having a permeability of higher than or equal to $0.1 \times 10^{-15}$ $m^2$ after pre-curing a composition that contains at least a cement component, a pulp, a reinforcing fiber, and water as described above, and further carbonation-curing the obtained molded body, it is possible to produce a molded plate having a carbonation reaction rate of higher than or equal to 30%, preferably higher than or equal to 50%, and more preferably higher than or equal to 60%.

Formation of Paint Film (Coating)

The surface of the cured body having been subjected to the carbonation-curing may be painted (coated) depending on needs. A paint material is not limited to any specific one. Examples of the paint materials may include phenolic resin paint, synthetic resin ready-mixed paint, alkyd resin paint, phthalic resin paint, acrylic-alkyd resin paint, amino-alkyd resin paint, melamine baked resin paint, epoxy resin paint, modified epoxy-resin paint, tar epoxy-resin paint, polyurethane resin paint, moisture curable polyurethane resin paint, acrylic urethane resin paint, polyester urethane resin paint, alkyd-modified silicone resin paint, acrylic silicone resin paint, silicone resin paint, chlorinated rubber-based resin paint, vinyl acetate emulsion resin paint, acrylic resin paint, acrylic emulsion resin paint, NAD acrylic resin paint, vinyl chloride resin paint, fluororesin paint, and lacquer paint.

The fiber-reinforced carbonated hydraulic inorganic molded plate according to the present invention is highly densified and the neutralization thereof has progressed. Therefore, the painting material having alkali resistance, the painting material indispensable for a typical cement material, is not necessarily selected so that the present invention is economically advantageous.

Fiber-Reinforced Carbonated Hydraulic Inorganic Molded Plate

The fiber-reinforced carbonated hydraulic inorganic molded plate, according to the first product embodiment of the present invention obtained by the above-described method (first production method embodiment) can be a fiber-reinforced carbonated hydraulic inorganic molded plate having a high flexural strength, a small dimensional change rate per specific gravity, excellent anti-water permeability, and good paintability, because carbonation-curing of a pre-cured body is performed after hardening the pre-cured body on the whole to a degree that the pre-cured body is demoldable, so that development in densification progresses by faster reaction speed of the carbonation. Thus, even if the hydration by the hydraulic component, in which the reaction speed is slower than that of the carbonation, is incomplete, the above-described fiber-reinforced carbonated hydraulic inorganic molded plate can be obtained in a short time period. The preferable embodiment of the present invention enables to obtain a molded plate having a dimensional change rate per specific gravity of less than or equal to 0.10% (more preferably less than or equal to 0.09%).

The fiber-reinforced carbonated hydraulic inorganic molded plate, according to the second product embodiment of the present invention obtained by the above-described method (second production method embodiment), can be a fiber-reinforced carbonated hydraulic inorganic molded plate that is neutralized to inside thereof, because a pre-cured molded body having a high permeability is subjected to carbonation. Thus-obtained fiber-reinforced carbonated hydraulic inorganic molded plate has a high flexural strength and is excellent in dimensional stability since the carbonation has progressed to the inside thereof. In the preferable embodiment, the molded plate has a dimensional change rate per specific gravity of less than or equal to 0.10%.

Application

The fiber-reinforced carbonated hydraulic inorganic molded plate according to the present invention can be a fiber-reinforced carbonated hydraulic inorganic molded plate having a high flexural strength and a small dimensional change rate because the molded plate is densified by carbonation after a composition having a predetermined structure is pre-cured to be hardened into inside thereof. Accordingly, the fiber-reinforced carbonated hydraulic inorganic molded plate can be advantageously used in the field of building materials such as molded products including slate boards, tiles, wall panels, ceiling materials, floor panels, roof materials, and partition walls; and secondary products.

EXAMPLES

Examples will be described below in order to describe the present invention in more detail. However, the present invention is not limited to the examples. In Examples, "%" and "part" are on the basis of a mass unless otherwise specified.

Method for Measuring Fiber Tenacity

In accordance with JIS L-1015, sample fibers were left for five days at a temperature of 20° C. and under a relative humidity of 65% for humidity controlling (conditioning), and short-cut to have test length of 60 mm, and then breaking strength was measured using FAFEGRAPH M [manufactured by Textechno] at a tensile speed of 60 mm/min. The fiber tenacity was obtained by dividing the breaking strength by a fineness of sample fibers. The measurement was performed at least 10 times to obtain a mean value.

Method for Measuring Bulk Specific Gravity

In accordance with JIS A 5430, a test piece was put into an air dryer with stirrer and dried at 105° C.±5° C. for 24 hours, and thereafter the bulk specific gravity was calculated from the mass and volume of the test piece.

Method for Measuring Flexural Strength

A test body was cut to obtain, per one test body, three strip-like test pieces each having the length of about 150 mm and the width of about 50 mm. Thereafter, in order to adjust a water content of the test pieces at constant during measurement, the cut test pieces were dried for 72 hours using a drier adjusted at 40° C. Flexural strength of the test pieces was measured in accordance with JIS A 1408. The flexural strength was measured using Autograph AG500-B manufactured by SHIMADZU CORPORATION under conditions that the test speed (loading head speed) was 2 mm/min., and the bending span was 100 mm in the center loading method.

Method for Measuring Dimensional Change Rate

In accordance with JIS A 5430, a test piece was put in a dryer with stirrer at a temperature maintained at 60±3° C. After 24 hours, the test piece was taken out from the dryer and put in a desiccator having its humidity adjusted by silica gel, and left as it was until the temperature reached to room temperature (20±1.5° C.). Next, a milky white glass was attached to a test body, and mark lines were formed such that a distance between the mark lines was about 140 mm. and then a length between the mark lines was measured using a comparator having an accuracy of 1/500 mm. The measured length was regarded as a reference length. Next, the test body was laid on end such that the length side thereof was horizontally laid, and was soaked in water at 20° C.±1.5° C. such that the test body was soaked about 30 mm below the water surface. After 24 hours from soaking, the test body was taken out from the water, and water on the surface thereof was wiped, and a length between the mark lines was measured again. The length change rate due to water absorption was calculated as follows.

$$\frac{\text{Length between mark lines after water absorption} - \text{Length between mark lines in dry state}}{\text{Length between mark lines in dry state}} \times 100$$

Further, the obtained dimensional change rate was divided by the bulk specific gravity to obtain a dimensional change rate per specific gravity.

Method for Evaluating Anti-Water Permeability

In accordance with JIS A 5430, a tube (the inner diameter of 35 mm, the height of 300 mm) made of an acrylic resin was set to place on a test piece, and then a contact portion between the tube and the test piece was sealed with a sealing member. Thereafter water was poured up to the height of 250 mm from the bottom of the tube, and the test piece was left as it was for 24 hours to check water leak on the back surface of the test piece. As the anti-water permeability, the leak portion having a diameter that is less than 35 mm was determined as "A", the leak portion having a diameter of 35 to 60 mm was determined as "B", and the leak portion having a diameter that is greater than 60 mm was determined as "C".

Method for Evaluating Paintability

Onto a surface of a cured molded body sample, phthalic resin paint (NEO KING manufactured by KAWAKAMI PAINT MFG. CO., LTD) was applied. Thereafter, in accordance with JIS K 5600-7-7 (accelerated weather resistance and accelerated lightfastness (xenon lamp method)), the accelerated weather resistance test was performed. A case where crack, peeling, or expansion was clearly found was determined as "C", a case where the sign thereof was found was determined as "B", and a case where abnormality was not found at all was determined as "A".

Method for Measuring Permeability

The permeability was measured in accordance with JIS R 2115.

The permeability of a substance represents a characteristic that the substance allows gas to pass therethrough due to difference in pressure, and the permeability is calculated by using the following formula in which the volume of gas that passes through the substance in a certain time period is used.

$$V/t = \mu * (1/\eta) * (A/\delta) * (p1-p2) * (p1+p2)/2P \quad (1)$$

Wherein V: an amount of gas ($m^3$) that passes through the substance at a pressure $p1$, t: time (s) required for the amount (V) of gas to pass through the substance, $\mu$: permeability ($m^2$) of the substance, $\eta$: viscosity (Pa·s) of the gas at a test temperature, A: cross-sectional area ($m^2$) of the substance through which the gas passes, $\delta$: thickness (m) of the substance through which the gas passes, P: absolute pressure (Pa) of the gas obtained when a volume of the gas is measured, p1: absolute pressure (Pa) obtained when the gas enters into the substance, and p2: absolute pressure (Pa) obtained when the gas separates from the substance.

The test piece was tested as a column having a diameter of 50 mm±2 mm×a height of 6 mm to 7 mm.

In the above formula (1), a high permeability $\mu$ of the substance can be regarded as an index representing an advantageous gas permeability of the inside thereof.

Measurement of Carbonation Reaction Rate

A 1.0 w/v % phenolphthalein ethanol (90) solution manufactured by Wako Pure Chemical Industries, Ltd. was applied to the cross-sectional surface of the molded body before and after the carbonation-curing. Photographs of the cross-sectional surface of the molded body were taken one minute later from the application. Thereafter, by use of color tone dyed with the phenolphthalein in the photograph before carbonation-curing, the cross-sectional photograph after carbonation-curing was evaluated as follows: if the photograph after carbonation-curing had a portion having a color tone similar to the dyed color tone in the photograph before carbonation-curing, the portion is regarded as being dyed. Using an image analysis software (free software IMAGE-J), the dyed area was totally calculated and then the carbonation reaction rate was calculated by the following formula:

$$\text{Carbonation reaction rate (\%)} = \frac{\text{(Cross-sectional area} - \text{Dyed area)}}{\text{(Cross-sectional area)}} \times 100$$

Measurement of Reaction Rate of Belite

A test body having been subjected to carbonation reaction was pulverized in a mortar grinding machine, and then added to water to remove fiber components with gauze. Further, paste component in the filtrate was filtered through filter paper to obtain a sample left on the filter paper, and then dried in a desiccator at 20° C. for three days to obtain an analysis sample. The sample was subjected to qualitative analysis using an X ray diffraction device (MultiFlex manufactured by Rigaku Corp.), and subjected to quantitative analysis by Rietveld analysis to determine hydration product and un-hydrated cement minerals. According to the result thereof, the reaction rate of the belite was calculated from the following formula.

$$\text{Belite reaction rate (\%)} = \frac{[\text{Belite component (\%) in raw material}] - [\text{Belite component (\%) in the test body}]}{[\text{Belite component (\%) in raw material}]} \times 100$$

Hereinafter, specific examples of the fiber-reinforced carbonated hydraulic inorganic molded plate according to a first configuration (a first product) of the present invention and the method for producing the fiber-reinforced carbonated hydraulic inorganic molded plate according to a second configuration (a first production method) of the present invention will be described according to Examples 1 to 8.

Example 1

As a PVA fiber, a fully saponified PVA having a degree of polymerization of 1700 (PVA1) was dissolved in water at a concentration of 16.5%, and boric acid was added at 1.6% relative to the PVA to prepare a spinning dope. The spinning dope was subjected to wet-spinning in a coagulation bath having a temperature of 70° C. and containing 11 g/L of sodium hydroxide and 350 g/L of sodium sulfate, and the spun fibers were drawn by a roller, neutralized, subjected to wet heat drawing, washed with water, and dried in a usual method, subjected to dry heat drawing at 235° C., and taken up such that the total draw ratio was 19 times in a heat treatment process of the same fiber production process. The obtained fiber had the fiber diameter of 7 μm and the fiber tenacity of 14.3 cN/dtex. The obtained fibers were cut having a fiber length of 4 mm (aspect ratio: 571).

Molded body: 1.5 parts by mass of the short-cut PVA fibers were added to a composition containing 3 parts by mass of pulp (NUKP) having Canadian freeness of 115 ml; and 95.5 parts by mass of ordinary Portland cement (β-belite content: 27% by mass) to mold a layered plate produced by Hatschek process-(sheetmaking method). Thereafter, the pre-curing was conducted in a wet-heat curing tank in the air in which the RH was 100%, at 80° C. for 8 hours. Thereafter, as the carbonation-curing, the plate was put into an Asahi neutralization test device ACT-250 manufactured by ASAHI KAGAKU CO., LTD., and treated for 24 hours in a condition where the concentration of carbon dioxide gas was 20%, the humidity was 90%, and the temperature was 40° C. The performance of the obtained molded body product is shown in Table 1. Despite the short secondary curing (carbonation-curing) period for 24 hours, the obtained molded body had a bulk specific gravity of 1.7 so that densification was greatly enhanced, a high flexural strength of 28 N/mm², and a small dimensional change rate per specific gravity of 0.065%. Further, the molded body had satisfactory anti-water permeability and paintability.

Example 2

A molded body was produced in the same manner as in Example 1 except that low heat cement (β-belite content: 50% by mass) was used as the cement. The performance of the obtained molded body product is shown in Table 1. Despite the short secondary curing period for 24 hours, the obtained molded body had a bulk specific gravity of 1.7 so that densification was greatly enhanced, a high flexural strength of 26 N/mm², and a small dimensional change rate per specific gravity of 0.053%. Further, the molded body had satisfactory anti-water permeability and paintability.

Example 3

A molded body was produced in the same manner as in Example 1 except that special cement (γ-belite content: 50% by mass) was used as the cement. The performance of the obtained molded body product is shown in Table 1. Despite the short secondary curing period for 24 hours, the obtained molded body had a bulk specific gravity of 1.7 so that densification was greatly enhanced, a high flexural strength of 24 N/mm², and a small dimensional change rate per specific gravity of 0.041%. Further, the molded body had satisfactory the molded body had satisfactory anti-water permeability and paintability.

Example 4

A molded body was produced in the same manner as in Example 2, and thereafter further left as it was for 13 days at 20° C. and RH 100%, whereby hydration of the cement was caused to progress. The performance of the obtained molded body product is shown in Table 1. The obtained molded body had a bulk specific gravity of 1.7 so that densification was greatly enhanced, an extremely high flexural strength of 32 N/mm², and a small dimensional change rate per specific gravity of 0.053%. Further, the molded body had satisfactory anti-water permeability and paintability.

Example 5

A molded body was produced in the same manner as in Example 1 except that 2 parts by mass of PVA2 (fiber diameter of 26 μm, fiber length of 6 mm, fiber tenacity of 12 cN/dtex, aspect ratio of 231) were added as the PVA fiber. The performance of the obtained molded body product is shown in Table 1. Despite the short secondary curing period for 24 hours, the obtained molded body had a bulk specific gravity of 1.7 so that densification was greatly enhanced, a high flexural strength of 24 N/mm², and a small dimensional change rate per specific gravity of 0.059%. Further, the molded body had satisfactory anti-water permeability and paintability.

Example 6

A molded body was produced in the same manner as in Example 1 except that 3 parts by mass of PVA3 (fiber diameter of 40 μm, fiber length of 8 mm, fiber tenacity of 12 cN/dtex, aspect ratio of 200) were added as the PVA fiber.

The performance of the obtained molded body product is shown in Table 1. Despite the short secondary curing period for 24 hours, the obtained molded body had a bulk specific gravity of 1.7 so that densification was greatly enhanced, a high flexural strength of 25 N/mm$^2$, and a small dimensional change rate per specific gravity of 0.065%. Further, the molded body had satisfactory anti-water permeability and paintability.

Example 7

A molded body was produced in the same manner as in Example 1 except that 2 parts by mass of polypropylene fiber (manufactured by Daiwabo, fiber diameter of 17 μm, fiber length of 6 mm, fiber tenacity of 5.3 cN/dtex, aspect ratio of 353) were added as the reinforcing fiber. The performance of the obtained molded body product is shown in Table 1. Despite the short secondary curing period for 24 hours, the obtained molded body had a bulk specific gravity of 1.7 so that densification was greatly enhanced, a high flexural strength of 20 N/mm$^2$, and a small dimensional change rate per specific gravity of 0.059%. Further, the molded body had satisfactory anti-water permeability and paintability.

Example 8

A molded body was produced in the same manner as in Example 1 except that 2 parts by mass of polyacrylonitrile fiber (Dolanit, fiber diameter of 12 μm, fiber length of 6 mm, fiber tenacity of 12 cN/dtex, aspect ratio of 500) were added as the reinforcing fiber. The performance of the obtained molded body product is shown in Table 1. Despite the short secondary curing period for 24 hours, the obtained molded body had a bulk specific gravity of 1.7 so that densification was greatly enhanced, a high flexural strength of 24 N/mm$^2$, and a small dimensional change rate per specific gravity of 0.065%. Further, the molded body had satisfactory anti-water permeability and paintability.

Comparative Example 1

A molded body was produced in the same manner as in Example 1 except that no PVA fiber was added, and curing for 24 hours in the air at 40° C. and the RH of 90% was performed as the secondary curing. The performance of the obtained molded body product is shown in Table 1. The flexural strength was as low as 15 N/mm$^2$. Further, the dimensional change rate per specific gravity was as large as 0.156%. Further, the anti-water permeability and paintability were insufficient.

Comparative Example 2

A molded body was produced in the same manner as in example 1 except that the secondary curing was performed in an atmosphere of 20% of carbon dioxide gas instead of the air. The performance of the obtained molded body product is shown in Table 1. The dimensional change rate per specific gravity was 0.059%, and the anti-water permeability and paintability were advantageous. However, the flexural strength was as low as 17 N/mm$^2$.

Comparative Example 3

A molded body was produced in the same manner as in Example 1 except that the curing was performed, as the secondary curing, for 24 hours in the air at 40° C. and the RH of 90%. The performance of the obtained molded body product is shown in Table 1. The obtained molded body had a bulk specific gravity of 1.5, and was thus less than that in Example 1. Further, the flexural strength was as low as 18 N/mm$^2$. The dimensional change rate per specific gravity was as large as 0.167%. Further, the anti-water permeability and paintability were insufficient.

Comparative Example 4

A molded body was produced in the same manner as in Example 1 except that the curing was performed, as the secondary curing, for 14 days in the air at 40° C. and the RH of 90%. The performance of the obtained molded body product is shown in Table 1. The obtained molded body had a bulk specific gravity of 1.5, and was thus less than that in Example 1. The flexural strength was as high as 25 N/mm$^2$ due to the hydration of the cement having progressed. However, the dimensional change rate per specific gravity was 0.167%, and the anti-water permeability and paintability were insufficient.

Comparative Example 5

A molded body was produced in the same manner as in Comparative Example 4 except that a laminated plate produced by sheetmaking was molded, and thereafter additionally pressed at 8 N/mm$^2$ for five minutes. The performance of the obtained molded body product is shown in Table 1. The obtained molded body had a bulk specific gravity of 1.7 higher than that in Comparative Example 4. Therefore, the flexural strength was as high as 28 N/mm$^2$, which is also higher than that in Comparative Example 4. On the contrary, the dimensional change rate per specific gravity was as large as 0.118%. While the anti-water permeability was slightly improved, paintability was insufficient. Thus, it was found that, although pressing caused increase in bulk specific gravity, the pressing alone was insufficient to provide a densification effect.

Comparative Example 6

A molded body was produced in the same manner as in Example 1 except that the curing for three hours in the air at 20° C. and the RH of 50% was performed as the pre-curing. The performance of the obtained molded body product is shown in Table 1. The obtained molded body had a low bulk specific gravity of 1.4, and a low flexural strength of 20 N/mm$^2$. Further, the dimensional change rate per specific gravity was as large as 0.171%. While paintability was good, anti-water permeability was insufficient. This could be explained by that carbonation was performed in a state where hardening of the molded body in the pre-curing was insufficient, and thus expansion preceded the densification.

Comparative Example 7

A molded body was produced in the same manner as in Example 1 except that PVA4 (fiber diameter of 100 μm, fiber length of 2 mm, fiber tenacity of 10 cN/dtex, aspect ratio of 20) was used as the PVA fiber. The performance of the obtained molded body product is shown in Table 1. The obtained molded body had a high bulk specific gravity of 1.7, and a small dimensional change rate per specific gravity of 0.071%. While both anti-water permeability and paintability were good, the flexural strength was as low as 17 N/mm$^2$.

TABLE 1

| | | Fiber | | | Formulation | | | Belite content in | | Pre-curing | | |
| | Fiber material | Fiber diameter (μm) | Fiber length (mm) | Aspect ratio | Fiber (mass %) | Pulp (mass %) | Cement (mass %) | cement (Content %) | Press | Atoms. | Temp. (° C.) | Humid. (%) | Period (hr) |
|---|---|---|---|---|---|---|---|---|---|---|---|---|---|
| Ex. 1 | PVA1 | 7 | 4 | 571 | 1.5 | 3 | 95.5 | β: 27 | No | Air | 80 | 100 | 8 |
| Ex. 2 | PVA1 | 7 | 4 | 571 | 1.5 | 3 | 95.5 | β: 50 | No | Air | 80 | 100 | 8 |
| Ex. 3 | PVA1 | 7 | 4 | 571 | 1.5 | 3 | 95.5 | γ: 50 | No | Air | 80 | 100 | 8 |
| Ex. 4 | PVA1 | 7 | 4 | 571 | 1.5 | 3 | 95.5 | β: 50 | No | Air | 80 | 100 | 8 |
| Ex. 5 | PVA2 | 26 | 6 | 231 | 2 | 3 | 95 | β: 27 | No | Air | 80 | 100 | 8 |
| Ex. 6 | PVA3 | 40 | 8 | 200 | 3 | 3 | 94 | β: 27 | No | Air | 80 | 100 | 8 |
| Ex. 7 | PP | 17 | 6 | 353 | 2 | 3 | 95 | β: 27 | No | Air | 80 | 100 | 8 |
| Ex. 8 | PAN | 12 | 6 | 500 | 2 | 3 | 95 | β: 27 | No | Air | 80 | 100 | 8 |
| Com. Ex. 1 | No | | | | | 3 | 97 | β: 27 | No | Air | 80 | 100 | 8 |
| Com. Ex. 2 | No | | | | | 3 | 97 | β: 27 | No | Air | 80 | 100 | 8 |
| Com. Ex. 3 | PVA1 | 7 | 4 | 571 | 1.5 | 3 | 95.5 | β: 27 | No | Air | 80 | 100 | 8 |
| Com. Ex. 4 | PVA1 | 7 | 4 | 571 | 1.5 | 3 | 95.5 | β: 27 | No | Air | 80 | 100 | 8 |
| Com. Ex. 5 | PVA1 | 7 | 4 | 571 | 1.5 | 3 | 95.5 | β: 27 | Yes | Air | 80 | 100 | 8 |
| Com. Ex. 6 | PVA1 | 7 | 4 | 571 | 1.5 | 3 | 95.5 | β: 27 | No | Air | 20 | 50 | 3 |
| Com. Ex. 7 | PVA4 | 100 | 2 | 20 | 1.5 | 3 | 95.5 | β: 27 | No | Air | 80 | 100 | 8 |

| | Carbonation-Curing | | | | | | | Performance | | | |
| | Atoms. | Conc. (%) | Temp. (° C.) | Humid. (%) | Period (hr) | Additional curing | Bulk specific gravity | Flexural strength (N/mm$^2$) | Demensional change rate per specific gravity (%) | Anti-water permeability | Paint-ability |
|---|---|---|---|---|---|---|---|---|---|---|---|
| Ex. 1 | $CO_2$ | 20 | 40 | 90 | 24 | | 1.7 | 28 | 0.065 | A | A |
| Ex. 2 | $CO_2$ | 20 | 40 | 90 | 24 | | 1.7 | 26 | 0.053 | A | A |
| Ex. 3 | $CO_2$ | 20 | 40 | 90 | 24 | 13 days* | 1.7 | 24 | 0.041 | A | A |
| Ex. 4 | $CO_2$ | 20 | 40 | 90 | 24 | | 1.7 | 32 | 0.053 | A | A |
| Ex. 5 | $CO_2$ | 20 | 40 | 90 | 24 | | 1.7 | 24 | 0.059 | A | A |
| Ex. 6 | $CO_2$ | 20 | 40 | 90 | 24 | | 1.7 | 25 | 0.065 | A | A |
| Ex. 7 | $CO_2$ | 20 | 40 | 90 | 24 | | 1.7 | 20 | 0.059 | A | A |
| Ex. 8 | $CO_2$ | 20 | 40 | 90 | 24 | | 1.7 | 24 | 0.065 | A | A |
| Com. Ex. 1 | Air | | 40 | 90 | 24 | | 1.6 | 15 | 0.156 | C | C |
| Com. Ex. 2 | $CO_2$ | 20 | 40 | 90 | 24 | | 1.7 | 17 | 0.059 | A | A |
| Com. Ex. 3 | Air | | 40 | 90 | 24 | | 1.5 | 18 | 0.167 | C | C |
| Com. Ex. 4 | Air | | 20 | 90 | 14 days | | 1.5 | 25 | 0.167 | C | C |
| Com. Ex. 5 | Air | | 20 | 90 | 14 days | | 1.7 | 28 | 0.118 | BC | C |
| Com. Ex. 6 | $CO_2$ | 20 | 40 | 90 | 24 | | 1.4 | 20 | 0.171 | C | A |
| Com. Ex. 7 | $CO_2$ | 20 | 40 | 90 | 24 | | 1.7 | 17 | 0.071 | A | A |

*Under atmosphere at 20° C. and RH100%

Hereinafter, specific examples of the fiber-reinforced carbonated hydraulic inorganic molded plate according to the first configuration (the first product and the second product) of the present invention, and the method for producing the fiber-reinforced carbonated hydraulic inorganic molded plate according to the second configuration of the present invention will be described according to Examples 9 to 13.

Example 9

The following raw materials were used to produce a composition shown in Table 2.

Polyvinyl alcohol (PVA) fiber: A fully-saponified PVA having a polymerization degree of 1700 was dissolved in water at a concentration of 16.5%, and boric acid was added at 1.6% relative to the PVA to prepare a spinning dope. The spinning dope was subjected to wet-spinning in a coagulation bath having a temperature of 70° C. and containing 11 g/L of sodium hydroxide and 350 g/L of sodium sulfate, and the spun fibers were drawn by a roller, neutralized, subjected to wet heat drawing, washed with water, and dried in a usual method, and subjected to dry heat drawing at 235° C., and taken up such that the total draw ratio was 19 times in a heat treatment process of the same fiber production process. The obtained fiber had the fiber diameter of 7 μm and the fiber tenacity of 14.3 cN/dtex. The obtained fibers were cut having a fiber length of 4 mm (aspect ratio: 571).

Pulp (NUKP): (Cello-fiber manufactured by PALITEK CORP [Degree of beating CSF=115 ml (see Note 1)])

Cement: ordinary Portland cement (β-belite content: 20% by mass)

(Note 1) [Freeness (CSF) ml] Method for testing a freeness of pulp (JIS P 8121-1976): the test was conducted in the Canadian standard method, and a mean value obtained by amendment for obtaining values at the slurry concentration of 0.3% by mass and the temperature of 20° C. was set as a Canadian standard freeness represented in ml with an accuracy of 1 ml.

Production of Molded Body

Into a composition containing 3 parts by mass of the pulp (NUKP) (manufactured by PALITEK CORP. "Cello-fiber") and 95.5 parts by mass of ordinary Portland cement, was added 1.5 parts by mass of the PVA short cut fibers having a fiber length of 4 mm to obtain a slurry containing 3.2% by mass of a solid component and 96.8% by mass of water. The slurry was poured into a mold having a metal mesh on the bottom, and water was filtered to collect a solid component equivalent to the thickness of 0.4 mm. Thereafter, 10 pieces of the solid components were overlaid with each other so as to have a total thickness of 4 mm±0.3 mm, and were then pressed to squeeze liquid from the solid components at the pressure of 2 N/mm² for five minutes, thereby producing a molded body. The molded body had a water content of 35% at this time, 56% in terms of W/C.

Pre-Curing

After the molded body was produced, the molded body was subjected to the pre-curing (primary curing) at a temperature of 50° C. under saturated humidity (RH of 100%) for 8 hours. The permeability of the pre-cured molded body was $4 \times 10^{-15}$ m².

Carbonation-Curing

The pre-cured molded body was put into an Asahi neutralization test device ACT-250 manufactured by ASAHI KAGAKU CO., LTD., and was treated for 12 hours in a condition that the concentration of carbon dioxide gas was 20%, the temperature was 40° C., and the humidity was 60% so as to perform carbonation-curing on both surfaces of the molded body. The performance and the carbonation reaction rate of the obtained molded body are shown in Table 2.

Further, FIG. 1 shows a photograph of a cross-sectional surface of the molded body used for measuring the carbonation reaction rate and obtained by dyeing with phenolphthalein. Red color unique to dyeing with phenolphthalein was observed merely to a small extent.

Example 10

A molded body was produced in the same manner as in Example 9 except that an amount of pulp to be blended was changed from 3 parts by mass to 4 parts by mass, and an amount of Portland cement to be blended was changed from 95.5 parts by mass to 94.5 parts by mass. The pre-curing was performed in the same manner as in Example 9 except that the temperature was changed from 50° C. to 80° C. The permeability of the pre-cured molded body was $6 \times 10^{-15}$ m². The molded body obtained after the pre-curing was subjected to the carbonation-curing in the same manner as in Example 9. The performance and the carbonation reaction rate of the obtained molded body are shown in Table 2.

Example 11

A molded body was produced in the same manner as in Example 9 except that 3 parts by mass of fly ash (FA) microballoon (lightweight aggregate) (KAINOSPHERES manufactured by KANSAI MATEC CO., LTD.) were added to pulp of which the blending amount was the same as that in Example 9, and an amount of Portland cement to be blended was changed from 95.5 parts by mass to 92.5 parts by mass. The pre-curing was performed in the same manner as in Example 9 except that the temperature was changed from 50° C. to 80° C., to produce a molded body. The permeability of the pre-cured molded body was $7 \times 10^{-15}$ m². The molded body obtained after the pre-curing was subjected to the carbonation-curing in the same manner as in Example 9. The performance and the carbonation reaction rate of the obtained molded body are shown in Table 2.

Example 12

The carbonation-curing was performed in the same manner as in Example 9 except that the concentration of carbon dioxide gas at the carbonation-curing was changed from 20% to 5%. The performance and the carbonation reaction rate of the obtained molded body are shown in Table 2.

Example 13

The carbonation-curing was performed in the same manner as in Example 9 except that the carbonation period for the carbonation-curing was changed from 12 hours to 6 hours. The performance and the carbonation reaction rate of the obtained molded body are shown in Table 2.

Example 14

A composition containing 50 parts by mass of ordinary Portland cement (β-belite content: 20%), 7.5 parts by mass of No. 8 silica sand (fine aggregate), 4.5 parts by mass of silica fume (EFACO manufactured by TOMOE KOGYO CO., LTD.) (fine aggregate), 33 parts by mass of calcium carbonate (manufactured by Sankyo Seifun Kabushiki Kaisha, Grade 1) (fine aggregate), 3 parts by mass of dry-pulverized pulp, and 1 part by mass of methyl cellulose (Metolose manufactured by Shin-Etsu Chemical Co., Ltd.) (water-soluble polymer) was mixed using a kneader, and then 23% by mass of water relative to the total mass of the blended substances was added thereto and kneaded, and further 1.5 parts by mass of the PVA fiber (PVA-1) was added thereto and mixed with the obtained composition. The kneaded hydraulic material was put into a vacuum extrusion molding machine, and extrusion-molded through a die piece having the width of 50 mm and the thickness of 50 mm.

The molded body was subjected to the pre-curing (primary curing) for 8 hours at 50° C. under saturated humidity (RH 100%). The permeability of the pre-cured molded body was $1 \times 10^{-15}$ m².

The pre-cured molded body was put into an Asahi neutralization test device ACT-250 manufactured by ASAHI KAGAKU CO., LTD., and was treated for 72 hours in condition that the concentration of carbon dioxide gas was 20%, the temperature was 40° C., and the humidity was 60% so as to perform carbonation-curing on both surfaces of the molded body. The performance and the carbonation reaction rate of the obtained molded body are shown in Table 2.

Comparative Example 8

The PVA fiber same with that in Example 9 was used. Into a mortar mixer, were added 49.2 parts by mass of ordinary Portland cement (β-belite content: 20%) and 49.3 parts by mass of sea sand (fine aggregate), and further added water at an amount satisfying W/C of 56% and kneaded. Thereafter, 1.5 parts by mass of the PVA short cut fibers having a fiber length of 4 mm were added thereto and kneaded to obtain a kneaded mixture. The kneaded mixture was then poured into a mold such that the thickness was 4 mm±0.3 mm to produce a molded body. The obtained molded body was subjected to pre-curing under the same conditions as those in Example 9 so as to have a pre-cured molded body having a permeability of $0 \times 10^{-15}$ m$^2$. The obtained molded body was subjected to carbonation-curing in the same manner as in Example 9. The performance and the carbonation reaction rate of the obtained molded body are shown in Table 2.

FIG. 2 shows a cross-sectional photograph of the molded body obtained by dyeing with phenolphthalein, the molded body used for measuring the carbonation reaction rate. The entire cross-sectional surface of the molded body was dyed into red with phenolphthalein.

Comparative Example 9

By using the same fiber as that in Example 9, a molded body was produced in the same manner as in Example 9 by adding 1.5 parts by mass of the PVA short cut fibers having a fiber length of 4 mm to a composition containing 1 part by mass of pulp blended with 97.5 parts by mass of cement. The obtained molded body was subjected to pre-curing in the same condition as those in Example 9 to obtain a pre-cured molded body having a permeability of $0.1 \times 10^{-15}$ m$^2$. The obtained molded body was subjected to carbonation-curing in the same manner as in Example 9. The performance and the carbonation reaction rate of the obtained molded body are shown in Table 2.

Comparative Example 10

By using the same fiber as that in Example 9, a molded body was produced in the same manner as in Example 9 by adding 1.5 parts by mass of the PVA short cut fibers having a fiber length of 4 mm to a composition containing 3 parts by mass of pulp blended with 95.5 parts by mass of cement. The obtained molded body was pressed at the pressure of 8 N/mm$^2$, and was then subjected to pre-curing such that the temperature for the pre-curing was changed from 50° C. in Example 9 to 80° C., to obtain a pre-cured molded body having a permeability of $0.2 \times 10^{-15}$ m$^2$. Next, the obtained molded body was carbonated in the same carbonation conditions as those in Example 9. The performance and the carbonation reaction rate of the obtained molded body are shown in Table 2.

Comparative Example 11

By using the same fiber as that in Example 9, a molded body was produced in the same manner as in Example 9 by adding 1.5 parts by mass of the PVA short cut fibers having a fiber length of 4 mm to a composition containing 3 parts by mass of pulp blended with 95.5 parts by mass of cement. The obtained molded body was pressed at a pressure of 2 N/mm$^2$, but was not subjected to the pre-curing performed in Example 9. Thus, the molded body having a permeability of $4 \times 10^{-15}$ m$^2$ was obtained. Next, the obtained molded body was carbonated in the same carbonation conditions as those in Example 9. The performance and the carbonation reaction rate of the obtained molded body are shown in Table 2.

TABLE 2

| | Formulation | | | | | | | | | | | |
|---|---|---|---|---|---|---|---|---|---|---|---|---|
| | | | | | Water- | Cement | | | | | | |
| | | | | Fine | Light | soluble | Belite content | Press | | Pre-curing | | |
| | Production method | Fiber | Pulp | aggregate | aggregate | polymer | in cement | pressure | Atoms. | Temp. | Humid. | Period |
| | | | | (parts by mass) | | | (mass %) | (N/mm$^2$) | | (° C.) | (%) | (hr) |
| Ex. 9 | Sheetmaking | 1.5 | 3 | 0 | 0 | 0 | 95.5 | 20 | 2 | Air | 50 | 100 | 8 |
| Ex. 10 | Sheetmaking | 1.5 | 4 | 0 | 0 | 0 | 94.5 | 20 | 2 | Air | 80 | 100 | 8 |
| Ex. 11 | Sheetmaking | 1.5 | 3 | 0 | 3 | 0 | 92.5 | 20 | 2 | Air | 80 | 100 | 8 |
| Ex. 12 | Sheetmaking | 1.5 | 3 | 0 | 0 | 0 | 95.5 | 20 | 2 | Air | 50 | 100 | 8 |
| Ex. 13 | Sheetmaking | 1.5 | 3 | 0 | 0 | 0 | 95.5 | 20 | 2 | Air | 50 | 100 | 8 |
| Ex. 14 | Extrusion | 1.5 | 3 | 45 | 0 | 1 | 50 | 20 | — | Air | 50 | 100 | 8 |
| Com. Ex. 8 | Casting | 1.5 | 0 | 49.3 | 0 | 0 | 49.2 | 20 | — | Air | 50 | 100 | 8 |
| Com. Ex. 9 | Sheetmaking | 1.5 | 1 | 0 | 0 | 0 | 97.5 | 20 | 2 | Air | 50 | 100 | 8 |
| Com. Ex. 10 | Sheetmaking | 1.5 | 3 | 0 | 0 | 0 | 95.5 | 20 | 8 | Air | 80 | 100 | 8 |
| Com. Ex. 11 | Sheetmaking | 1.5 | 3 | 0 | 0 | 0 | 95.5 | 20 | 2 | — | — | — | — |

| | Permeation | Carbonation-curing | | | | Bulk | Flexural | Demensional change rate per specific | Carbonation reaction | Belite reaction |
|---|---|---|---|---|---|---|---|---|---|---|---|
| | rate ($10^{-15}$ m$^2$) | Atoms. | Conc. (%) | Temp. (° C.) | Humid. (%) | Period (hr) | specific gravity | strength (N/mm$^2$) | gravity (%) | rate (%) | rate (%) |
| Ex. 9 | 4 | CO$_2$ | 20 | 40 | 60 | 12 | 1.7 | 27 | 0.076 | 93 | 100 |
| Ex. 10 | 6 | CO$_2$ | 20 | 40 | 60 | 12 | 1.65 | 26 | 0.085 | 98 | 100 |

TABLE 2-continued

| | | | | | | | | | | | |
|---|---|---|---|---|---|---|---|---|---|---|---|
| Ex. 11 | 7 | CO$_2$ | 20 | 40 | 60 | 12 | 1.6 | 25 | 0.075 | 100 | 100 |
| Ex. 12 | 4 | CO$_2$ | 5 | 40 | 60 | 12 | 1.6 | 25.5 | 0.094 | 60 | 85 |
| Ex. 13 | 4 | CO$_2$ | 20 | 40 | 60 | 6 | 1.65 | 26 | 0.085 | 65 | 87 |
| Ex. 14 | 1 | CO$_2$ | 20 | 40 | 60 | 72 | 1.8 | 26 | 0.092 | 51 | 71 |
| Com. Ex. 8 | 0 | CO$_2$ | 20 | 40 | 60 | 12 | 2 | 16 | 0.075 | 2 | 28 |
| Com. Ex. 9 | 0.1 | CO$_2$ | 20 | 40 | 60 | 12 | 1.5 | 21 | 0.167 | 20 | 40 |
| Com. Ex. 10 | 0.2 | CO$_2$ | 20 | 40 | 60 | 12 | 1.5 | 21 | 0.133 | 25 | 43 |
| Com. Ex. 11 | 4 | CO$_2$ | 20 | 40 | 60 | 12 | 1.45 | 20 | 0.185 | 88 | 95 |

The results in Table 2 indicate that, in Examples 9 to 13, each of the molded body having been subjected to the carbonation-curing had the extremely high carbonation reaction rate of 60 to 100%, and the almost complete carbonation of the molded body had progressed up to the inside thereof, whereby the carbonated molded body had the high bulk specific gravity, the high flexural strength, and the small dimensional change rate per specific gravity.

Although, in Examples 9 to 13, the molded body having been subjected to pre-curing had the permeability of (4 to 7)×10$^{-15}$ m$^2$, the molded body having been subjected to pre-curing had the low permeability of (0 to 0.2)×10$^{-15}$ m$^2$ in Comparative Examples 8 to 10. As a result, the progress of carbonation was slow. This indicates that it is important that the permeability of the molded body having been subjected to the pre-curing is greater than or equal to a fixed value. In particular, in Comparative Example 8 in which pulp was not blended, the carbonation reaction rate was extremely low, and further a state of dyeing with phenolphthalein did not appear to indicate that the reaction had progressed evenly in the upper surface and the lower surface, and the obtained physical properties were low. Therefore, when the carbonation is performed in a state where the permeability is high, the carbonation progresses up to the inside of the molded body, whereby the performance of the carbonated molded body can be improved.

In Example 14, the thickness was great, and the vacuum extrusion molding was performed. Therefore, the permeability was 1×10$^{-15}$ m$^2$ and was thus slightly lower than those in other Examples were. However, a desired permeability was assuredly obtained. Therefore, it has been confirmed that, even in such a thick test body, the carbonation progresses.

In Comparative Example 11, the carbonation-curing was performed without performing the pre-curing. The obtained molded body had a low flexural strength and a large dimensional change rate. This may be because the carbonation-curing was performed without performing hardening by pre-curing, whereby expansion occurred by calcium carbonate generated due to carbonation reaction, and a densification effect was not obtained.

INDUSTRIAL APPLICABILITY

The fiber-reinforced carbonated inorganic molded plate obtained by the present invention has characteristics that, due to the carbonation, the bulk specific gravity is high, the flexural strength is high, and the dimensional change rate per specific gravity is small. In particular, the present invention is industrially applicable in the field of building materials (such as roof materials and wall materials).

Although the present invention has been fully described in connection with the preferred embodiments thereof with reference to the accompanying drawings, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A fiber-reinforced carbonated hydraulic inorganic molded plate which is a carbonation-cured product of a composition comprising:
   a cement component,
   a pulp, and
   a reinforcing fiber,
   wherein the fiber-reinforced carbonated hydraulic inorganic molded plate has a carbonation reaction rate of higher than or equal to 30%.

2. The fiber-reinforced carbonated hydraulic inorganic molded plate according to claim 1, wherein the fiber-reinforced carbonated hydraulic inorganic molded plate has a carbonation reaction rate of higher than or equal to 50%.

3. The fiber-reinforced carbonated hydraulic inorganic molded plate according to claim 1, wherein the fiber-reinforced carbonated hydraulic inorganic molded plate has a dimensional change rate per specific gravity of less than or equal to 0.1%.

4. The fiber-reinforced carbonated hydraulic inorganic molded plate according to claim 1,
   wherein the cement component comprises a belite at a proportion of 18% by mass or more.

5. The fiber-reinforced carbonated hydraulic inorganic molded plate according to claim 4, wherein the belite has a reaction rate of higher than or equal to 70%.

6. The fiber-reinforced carbonated hydraulic inorganic molded plate according to claim 1, wherein the reinforcing fiber is a polyvinyl alcohol fiber.

7. The fiber-reinforced carbonated hydraulic inorganic molded plate according to claim 1, wherein the fiber-reinforced carbonated hydraulic inorganic molded plate is obtained by carbonation-curing under an atmosphere containing carbon dioxide gas at a concentration of 8 to 30%.

8. The fiber-reinforced carbonated hydraulic inorganic molded plate according to claim 1, wherein the reinforcing fiber has an aspect ratio in a range of 40 to 1000.

9. The fiber-reinforced carbonated hydraulic inorganic molded plate according to claim 3, wherein the reinforcing fiber is a polyvinyl alcohol fiber.

10. A method for producing the fiber-reinforced carbonated hydraulic inorganic molded plate according to claim 1, the method comprising:
   preparing a molded body having a permeability of higher than or equal to 0.1×10$^{-15}$ m$^2$ by pre-curing a composition comprising a cement component, a pulp, a reinforcing fiber, and water; and carbonation-curing the molded body so as to produce a fiber-reinforced carbonated hydraulic inorganic molded plate having a carbonation reaction rate of higher than or equal to 30%.

11. The method according to claim 10,
wherein the composition comprises, as the cement component, a cement comprising a belite at a proportion of 18% by mass or more, and is rendered to be pre-cured to obtain a molded body having a sufficient hardness to be demoldable; and the molded body is carbonation-cured.

12. The method according to claim 10, wherein
the reinforcing fiber has an aspect ratio in a range of 40 to 1000.

13. The method according to claim 12, wherein
the composition comprises, as the cement component, a cement comprising a belite at a proportion of 18% by mass or more, and allows to be pre-cured to obtain a fiber-reinforced carbonated hydraulic inorganic molded body having a sufficient hardness to be demoldable; and the fiber-reinforced carbonated hydraulic inorganic molded body is carbonation-cured.

14. The method according to claim 12, wherein the pre-curing is performed under an atmosphere having a humidity of 65 to 100%.

15. The method according to claim 12, wherein the carbonation-curing is performed under an atmosphere containing carbon dioxide gas at a concentration of 5 to 30%.

16. The method according to claim 10, wherein the carbonation-curing is performed under an atmosphere containing carbon dioxide gas at a concentration of 8 to 30%.

17. The method according to claim 15, wherein the carbonation-curing is performed under an atmosphere containing carbon dioxide gas at a concentration of 8 to 30%.

* * * * *